United States Patent
Dent et al.

(10) Patent No.: US 6,490,261 B1
(45) Date of Patent: Dec. 3, 2002

(54) OVERLAPPING SLOT TRANSMISSION USING PHASED ARRAYS

(75) Inventors: Paul W. Dent, Pittsboro, NC (US); Karl J. Molnar, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/429,463

(22) Filed: Oct. 28, 1999

(51) Int. Cl.$^7$ .................................................. H04J 3/00
(52) U.S. Cl. ..................... 370/337; 370/345; 370/347; 370/321; 455/561; 455/522
(58) Field of Search .................... 370/347, 441, 370/442, 311, 318, 319, 320, 321, 336, 337, 344, 345, 480; 455/522, 561, 562, 115; 342/361, 371, 372, 373, 378

(56) References Cited

U.S. PATENT DOCUMENTS

| | | | |
|---|---|---|---|
| 4,513,412 A | | 4/1985 | Cox ............................ 370/29 |
| 4,866,710 A | | 9/1989 | Schaeffer |
| 5,303,240 A | * | 4/1994 | Borras et al. ............... 342/368 |
| 5,335,250 A | | 8/1994 | Dent et al. |
| 5,539,730 A | | 7/1996 | Dent |
| 5,548,813 A | | 8/1996 | Charas et al. |
| 5,555,271 A | | 9/1996 | Honda et al. |
| 5,566,168 A | | 10/1996 | Dent |
| 5,579,306 A | | 11/1996 | Dent |
| 5,594,941 A | | 1/1997 | Dent |
| 5,604,730 A | * | 2/1997 | Tiedemann, Jr. ............ 370/252 |
| 5,619,503 A | | 4/1997 | Dent |
| 5,740,165 A | * | 4/1998 | Vannucci ..................... 370/330 |
| 5,909,460 A | | 6/1999 | Dent |
| 5,983,112 A | | 11/1999 | Kay ............................ 455/504 |
| 6,072,788 A | | 6/2000 | Peterson et al. ............. 370/337 |
| 6,072,792 A | * | 6/2000 | Mazur et al. ................ 370/345 |
| 6,094,165 A | * | 7/2000 | Smith .......................... 342/361 |
| 6,301,238 B1 | * | 10/2001 | Hagerman et al. .......... 370/336 |
| 6,377,558 B1 | * | 4/2002 | Dent ............................ 342/354 |

FOREIGN PATENT DOCUMENTS

| | | | |
|---|---|---|---|
| WO | 9901949 | 1/1999 | |
| WO | WO 99/01949 | * 1/1999 | ............ H04B/7/05 |

OTHER PUBLICATIONS

U.S. patent application Ser. No. 08/887,726, Mazur et al., pending.
U.S. patent application Ser. No. 08/218,236, Dent et al., pending.

* cited by examiner

Primary Examiner—Nay Maung
Assistant Examiner—Sonny Trinh
(74) Attorney, Agent, or Firm—Coats & Bennett, P.L.L.C.

(57) ABSTRACT

A time-division multiple access (TDMA) base station is disclosed for preserving across-slot signal continuity of signals transmitted in different directions on a given frequency. The base station includes a multi-directional antenna for radiating signals. A processor is operatively coupled to the antenna for generating a first data signal for a first time slot of a TDMA frame including a first pre-determined symbol pattern and a second pre-determined symbol pattern, for generating a second data signal for a second time slot of the TDMA frame including the second predetermined symbol pattern, and for communicating the first data signal and the second data signal to the antenna such that the first data signal is radiated in a first direction and the second data signal is radiated in a second direction. The first data signal is modulated at a first phase for transmission in the first time slot at a first power level in the first direction on the given frequency. The second data signal is modulated at a second phase for transmission in the second time slot at a second power level in the second direction on the given frequency.

23 Claims, 3 Drawing Sheets

OVERLAPPING SLOT TRANSMISSION USING PHASED ARRAYS

FIELD OF THE INVENTION

This invention relates to digital cellular telephone systems and, more particularly, to base stations using directional antenna arrays.

BACKGROUND OF THE INVENTION

One cellular communication system, known as time-division multiple access (TDMA), divides the radio spectrum into plural channels. Each channel is sub-divided into time slots that can be assigned to a different subscriber. Mobile phones operating under the United States' D-AMPS standard, which is also known as IS54 or IS136, utilize a syncword to assist in demodulation and decoding of a transmitted signal to a mobile station. The syncword consists of a pattern of known symbols.

The syncword is transmitted at the beginning of each time slot that has been allocated for transmission from the base station to the mobile station. Systems that utilize the D-AMPS standard always transmit at a constant power level in all time slots on the same carrier frequency. A mobile station can decode the allocated slot using both the known symbols at the beginning of its allocated slot and the beginning of a subsequent slot, known as a postamble. As a result, demodulation and decoding may take place in forward or backward order. This may be done using the algorithms described in Dent et al., U.S. Pat. No. 5,335,250 or U.S. application Ser. No. 08/218,236, the specifications of which are incorporated by reference herein.

The use of a postamble syncword can thus be used to improve performance. Its use is possible because the D-AMPS downlink is TDM, rather than TDMA. TDM is a continuous transmission having phase, bit-timing and power level continuity across slot boundaries. Thus, all signals allocated to different slots at the same carrier frequency are transmitted by the base station at equal power. The power level must be the greatest of the three base station transmit power levels that the three mobiles' occupying the three slots per carrier require. Schaeffer, U.S. Pat. No. 4,866,710 discloses a system that concentrates calls within each frequency to reduce the number of frequencies carrying calls. Alternatively, Dent U.S. Pat. No. 5,579,306 discloses grouping calls onto the same carrier that have similar downlink power requirements and then minimizing the carrier power levels to the greatest of the power levels needed in any slot. Thus, the prior art describes various examples of attempting to maintain syncword transmissions coherent with the preceding slot to allow its use by receivers as a postamble.

Cellular systems are continually designed to obtain capacity improvement. One possible method relies on reduction of antenna beamwidth which effectively increases the number of azimuthal sectors available to construct a frequency re-use plan. The site re-use pattern can advantageously be smaller. For example, instead of a seven site by three sector re-use plan, a three-site by twelve sector re-use plan might be used. This brings one-third of the total frequency channels into use within a site instead of only one-seventh. This provides a capacity gain of 7/3.

Increasing antenna beam directivity can result in more sectors than carrier frequencies. Then it is no longer possible to give each sector a unique frequency. To avoid the use of the same frequency at the same time in different sectors of the same site, each frequency may be divided into time slots to create a large number of unique time slot-frequency pairs that can be divided among the sectors. The construction of time and frequency re-use plans is described in Dent U.S. Pat. Nos. 5,539,730; 5,566,168, 5,619,503 and 5,594,941, and Honda et al. U.S. Pat. No. 5,555,271, the specifications of which are hereby incorporated by reference herein.

Charas et al. U.S. Pat. No. 5,548,813, the specification of which is incorporated by reference herein, describes how different time slots in a TDMA system are transmitted using different groups of elements of a phased array to achieve different effective isotopically radiated power levels for different time slots.

The above described prior art transmits different time slots in different directions or at different power levels. This violates the TDM signal continuity across slots that current D-AMPS mobile stations assume. Mazur et al. U.S. patent application Ser. No. 08/887,726 discloses the use of multiple antenna arrays for preserving the signal continuity across time-slots.

Adaptive channel assignment (ACA) is also used to obtain capacity improvements. ACA is an automatic way of achieving re-use partitioning. Channels may be re-used on a tighter grid when they are transmitted at less than maximum power to mobiles nearer the center of cells and not at a cell edge. A 1.7:1 gain in capacity over fixed re-use plans is evidenced in simulations. However, this gain is conditional upon the use of dynamic power control. If power levels are not adapted dynamically for each call, then the gain through using ACA drops to about 1.3:1. Again, dynamically varying the power level between slots may also violate the TDM signal continuity that current D-AMPS mobile stations assume.

Thus, there is a need for a method for maintaining signal continuity across slots when slots are transmitted in different directions and at different power levels.

SUMMARY OF THE INVENTION

In accordance with the invention there is provided a method and system that uses overlapping slot transmissions using phased arrays.

Broadly, there is disclosed herein a time-division multiple access (TDMA)base station for preserving across-slot signal continuity of signals transmitted in different directions on a given frequency. The base station includes a multi-directional antenna for radiating signals. A processor is operatively coupled to the antenna for generating a first data signal for a first time slot of a TDMA frame including a first pre-determined symbol pattern and a second pre-determined symbol pattern, for generating a second data signal for a second time slot of the TDMA frame including the second pre-determined symbol pattern, and for communicating the first data signal and the second data signal to the antenna such that the first data signal is radiated in a first direction and the second data signal is radiated in a second direction. The first data signal is modulated at a first phase for transmission in the first time slot at a first power level in the first direction on the given frequency. The second data signal is modulated at a second phase for transmission in the second time slot at a second power level in the second direction on the given frequency.

It is a feature of the invention that the first power level is substantially equal to the second power level.

It is another feature of the invention that the first phase is at a 90° phase difference with respect to the second phase.

It is a further feature of the invention to provide a modulator for modulating the first data signal and the second data signal on the given frequency.

It is still another feature of the invention that the processor performs the modulating of the first data signal and the second data signal on the given frequency.

It is still a further feature of the invention that the power level of the first data signal is ramped down from the first power level to zero after the second pre-determined symbol pattern is transmitted in the first direction, and the power level of the second data signal is ramped up from zero to the second power level before transmission of the second pre-determined symbol pattern in the second direction.

It is still an additional feature of the invention that the first direction and the second direction are two of four pre-determined directions.

It is disclosed in accordance with another aspect of the invention a TDMA cellular base station for transmitting signals in different time slots of a TDMA frame in different directions while preserving across-slot signal continuity as seen by intended receivers. The base station includes an antenna for forming a plurality of directional beams. A first signal generator modulates a first data signal including a first pre-determined symbol pattern, first data symbols and a second pre-determined symbol on a given radio frequency channel to be radiated during a first time slot at a first power level in a first direction using the antenna. The first signal generator smoothly ramps a first data signal level down from the first power level to zero after transmission of the second pre-determined symbol pattern. A second signal generator modulates a second data signal including at least the second pre-determined symbol pattern and second data symbols on the given radio frequency channel to be radiated during a second time slot at a second power level in a second direction using the antenna. The first and second time slots overlap during transmission of the second known symbol pattern and the second symbol generator ramps up from zero to the second power level prior to transmitting the second pre-determined symbol pattern.

It is a feature of the invention that the first signal generator modulates the same data symbols as the second signal generator while performing the down-ramping.

It is another feature of the invention that the second signal generator modulates the same data symbols as the first signal generator while performing the up-ramping.

It is an additional feature of the invention that the first and second signal generators are adapted to cause the first signal to be at a 90° phase difference with respect to the second data signal when the first and second data signals are radiated from the antenna in the first and second direction during the up-ramping, second pre-determined pattern transmission and down-ramping.

There is disclosed in accordance with still another aspect of the invention a method of preserving across-slot signal continuity of signals transmitted in different directions on a given frequency from a TDMA base station, comprising the steps of generating a first data signal for a first time slot of a TDMA frame including a first pre-determined symbol pattern and a second pre-determined symbol pattern; generating a second data signal for a second time slot including the second pre-determined symbol pattern; modulating the first data signal on the given frequency at a first phase; modulating the second data signal on the given frequency at a second phase; transmitting the first data signal from the base station in the first time slot at a first power level in a first direction, on the given frequency at the first phase; and transmitting the second data signal from the base station in the second time slot at a second power level in a second direction, on the given frequency at the second phase.

There is disclosed in accordance with yet another aspect of the invention a method of transmitting signals in different time slots of a TDMA frame in different directions in a TDMA cellular base station using a multi-beam directive antenna array while maintaining across-slot signal continuity as seen by intended receivers of the time slot, including the steps of transmitting a first signal in a first direction at a first power level during a first time slot, including transmitting a postamble comprised of pre-determined symbols at an end of the first time slot, and transmitting a second signal in a second direction at a second power level during a second time slot, including transmitting a preamble at the beginning of the second time slot comprised of the pre-determined symbols, and overlapping the transmission of the postamble.

It is a feature of the invention to include driving elements of the antenna such that the first signal and the postamble are received at the first power level by an intended receiver lying in the first direction, and the preamble and the second signal are received at the second power level by a different intended receiver lying in the second direction.

It is another feature of the invention to include selecting the first and second power levels such that each of the intended receivers receives at least a minimum acceptable signal level while minimizing a total power radiated by the antenna array.

It is another feature of the invention to include selecting the antenna element drive signals to cause a directional transmission to smoothly change from the first direction to the second direction during the overlapping transmission of the preamble and postamble.

It is a further feature of the invention to continue transmission of the first signal in the first direction for a period after completing transmission of the postamble while the power level of transmission of the first signal is smoothly ramped-down to zero.

It is yet another feature of the invention to include commencing transmission of the second signal in the second direction for a second period before starting transmission of the preamble while the power level of transmission of the second signal is smoothly ramped-up from zero.

Further features and advantages of the invention will be readily apparent from the specification and from the drawings.

DETAILED DESCRIPTION OF THE INVENTION

In accordance with the invention, a time-division multiple access (TDMA) digital cellular base station uses a directive antenna array. The antenna array generates a number of directional transmissions directed towards mobile stations located at different azimuth angles to the base station site. A transmission to a given mobile station takes place in an allocated time slot of a TDMA frame period using an allocated radio carrier frequency. The transmission is directed toward the mobile station using the directional antenna array. The invention permits transmission of successive time slots on the same carrier frequency to occur in different directions or at different power levels while maintaining signal continuity as seen by receivers.

Many existing mobile stations are designed to be compatible with the U.S. digital cellular system standard IS54 or IS136, which is also referred to as digital advanced mobile phone system (D-AMPS). To maintain compatibility with these existing mobile stations, the pattern of known symbols in the syncword transmitted at the beginning of every time slot must be transmitted with phase, power and timing continuity with the preceding slot as well as the following slot. This allows the mobile station to employ either forward demodulation or backward demodulation, as is known.

In accordance with the invention, the transmission of a time slot in a given direction using the directional antenna array is extended to transmit the syncword in the following time slot, known as a postamble. The transmission of the following slot in a second direction commences by simultaneously transmitting the same syncword in the second direction, thus overlapping the extended transmission in the first direction. The first transmission is smoothly terminated by ramping its signal level to zero while transmitting the same data symbols that follow the syncword in the second slot. Similarly, the second slot transmission commences smoothly by up-ramping its power level before transmission of its syncword, while transmitting the same data symbols as transmitted at the end of the first slot in the first direction. To prevent overlapping transmissions from interfering destructively, the second transmission may occur with a 90° phase shift relative to the first transmission with which it overlaps. Thus, when the number of time slots in a frame is odd, as in full-rate D-AMPS, transmission of a corresponding slot in successive TDMA frames occurs with an alternating 90° phase shift in alternate frames, or with a successive 90° phase rotation.

In accordance with another aspect of the invention, the antenna array uses beam-forming weighting during transmission of the syncword occurring at the end of a first slot and the beginning of a second slot. The mobile station lying in the first direction receives that syncword with phase, amplitude and timing continuity to its slot's immediately preceding data symbols. Simultaneously, the mobile station lying in the second direction receives the syncword with phase, amplitude and timing continuity to its slot's immediately following data symbols. To achieve this, the power level at which transmission in the second slot commences or at which transmission of the first slot terminates must be coordinated in dependence on the first and second directions and in particular in dependence on the difference in the directions. These power levels are coordinated to insure that each mobile station receives a signal level greater than or equal to a minimum acceptable signal level while transmitting the minimum total amount of power from the antenna array.

Figure 1:
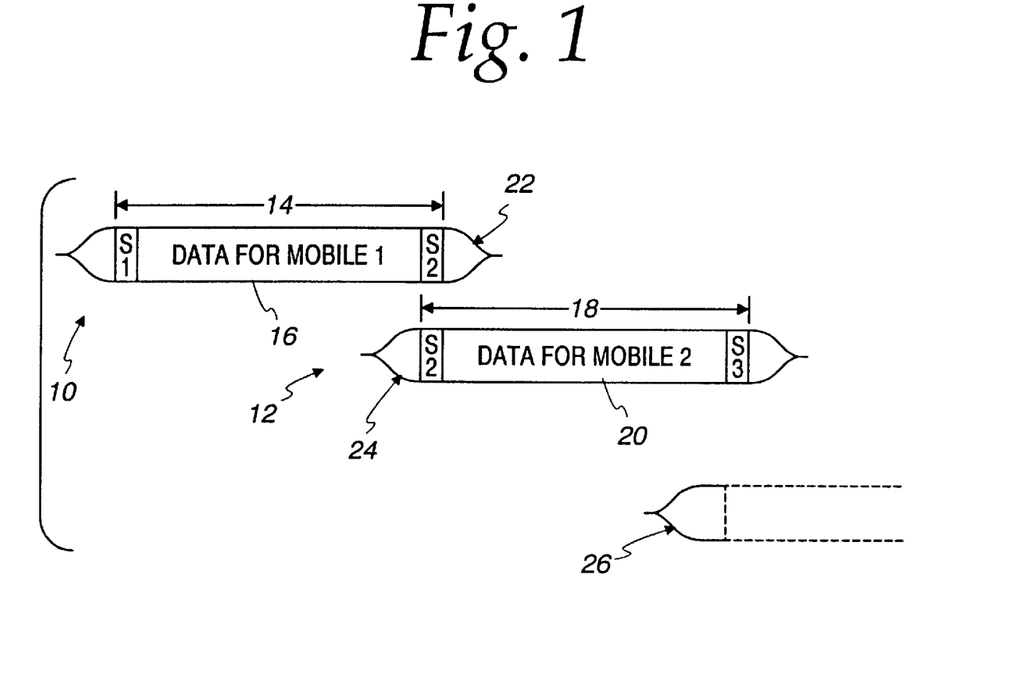
FIG. 1 is a timing diagram illustrating transmission of multiple time slots in different directions in accordance with the invention.

Referring initially to FIG. 1, a timing diagram illustrates a first transmission of a first beam 10 intended for a first mobile station and subsequent transmission of a second beam 12 intended for a second mobile station. A first time slot 14 comprises a first preamble syncword S1, followed by a first set of data symbols 16 and a postamble syncword S2. The beam 10 of the first transmission is transmitted to the first mobile station at a first power level in a first direction. Thus, the transmission of the first time slot is extended to include transmission of the postamble syncword S2.

A second time slot 18 comprises a preamble syncword S2, which is the same as the first time slot's postamble syncword S2 and overlaps with it in time. The second time slot also includes a second set of data symbols 20 and a postamble syncword S3. Thus, this implementation of the invention is characterized by transmitting the same syncword S2 in two directions simultaneously during an overlapping period.

As illustrated, the first transmission is smoothly ramped to zero power level after transmission of the second syncword S2 as illustrated at 22. Also, the second transmission 12 is smoothly ramped up from a zero level before transmitting the syncword S2 as illustrated at 24. During the up-ramping period 24 and the down-ramping period 22 the same data symbols are modulated onto the overlapping transmissions. FIG. 1 also illustrates transmission of a third beam 26 that similarly overlaps the second transmission, as is apparent.

The length of time of each of the up-ramping period 24 and the down-ramping period 22 is approximately one millisecond. Both times together represent about 30% of the D-AMPS' 6.6 millisecond burst duration, but only about 10% of the total power in the worst case when the first and second slots are of equal power level.

Figure 2:
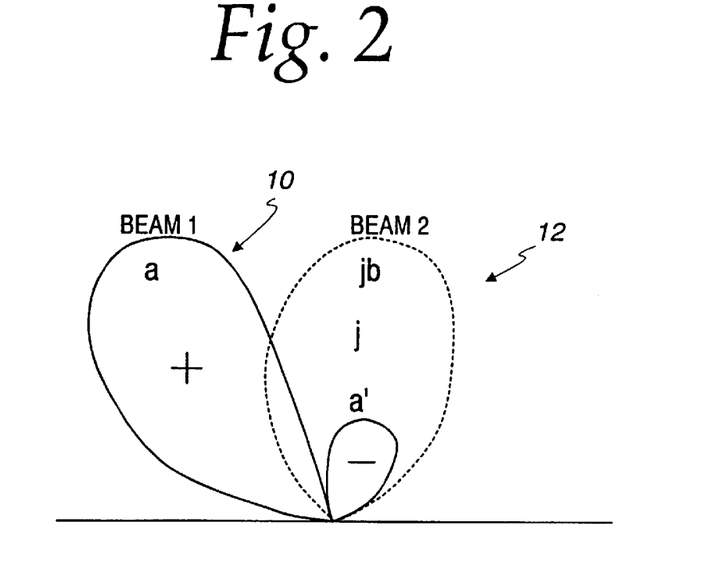
FIG. 2 is a curve illustrating radiation patterns for transmitting first and second beams in accordance with the invention.

A typical antenna array uses a left-right hermitian-symmetrical set of beam-forming weights. The radiation field from the array has the same phase in all directions apart from a change from + to −, i. e., from 0° to 180° passing through a radiation pattern null, thus the side lobe or amplitude a' in FIG. 2 has a sign of −, as compared with the main lobe or amplitude 'a' (Beam 1). Thus, a second beam transmitting the same data at the same time in a different direction, if also using such weights, may either add to or subtract from the radiation of the first beam in the second direction. In accordance with the invention, the transmission of the second beam 12 is made to have a phase difference of 90° (as indicated by the imaginary scaling factor 'j' in Beam 2) with that of the first beam 10, as illustrated in FIG. 2. This avoids the uncertainty of whether the two beams will add constructively or destructively. Particularly, when using up-ramping and down-ramping to smoothly transition from non-overlapped transmissions to overlapped transmissions and back again, the signal level received by each mobile station is the square root of the sum of the squares of contributions from each of the transmissions. The contributions are respectively the main beam contribution toward the mobile station for which the beam is intended and the side lobe contribution from the other beam in that direction. Square law addition is the deliberate result of the 90° phase shift between the two transmissions. This insures that the signal level received by each mobile station is at least equal to the desired level transmitted by one beam alone, when the power level has reached its stable value after up-ramping. The increase in signal level during the overlapped syncword transmission does not violate the desired cross-slot continuity, providing the power up-ramping and down-ramping occurs more slowly than signal level changes due to Rayleigh fading which the receiver is designed to expect. Likewise, the rotation in phase of the resultant sum of the contributions from Beam 1 and Beam 2 in either direction does not biolate phase continuity providing the up and down-ramping are slower than expected fading. To cope with fading, the receiver utilizes channel tracking which updates the reference amplitude and phase used for decoding after decoding each data symbol, and this channel tracking can then track the changes due to up-and down-ramping.

In the second implementation of the invention, referred to above, signals can be transmitted from each array element, chosen such that the first mobile station receives the postamble syncword in the first direction at exactly the same level and phase as its preceding data symbols. Simultaneously, a second mobile station receives the same syncword as its preamble in a second direction and at a second desired power level equal to the power level of the following data symbols. The feasibility of satisfying these two requirements simultaneously is considered mathematically below.

If a transmission is created using an N-element antenna array, with N>2, then each element is driven with signals a(i) to form the column vector $$A = \begin{matrix} a1 \\ a2 \\ \vdots \\ a(N) \end{matrix}$$

Denoting the propagation channel from an antenna element i to a mobile station j by Cji, where j=1, 2 and denoting a.S(t) and b.S(t) as the two syncword signals for the respective two mobiles to receive, where 'a' and 'b' are the desired signal amplitude levels, then $$C \cdot A = \begin{matrix} a \\ b \end{matrix} = S,$$

where S is a two-element column vector.

There are N unknowns a1 ... a(N) and only two equations to satisfy. Imposing the additional condition that the total radiated power $$A\#A$$

is to be a minimum (thereby strewing around the least interference in unintended directions), a unique solution is found to be $$A = C\#.(CC\#')^{-1}.S \qquad (1)$$

Figure 3:
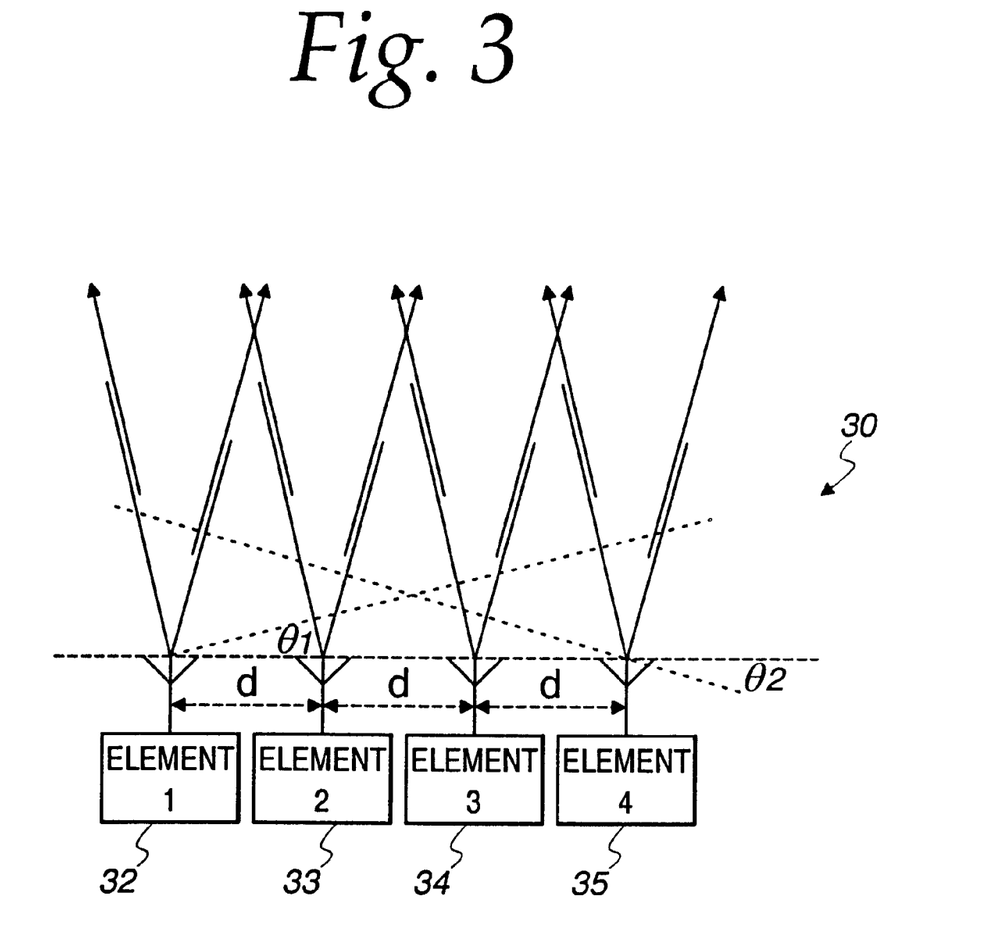
FIG. 3 illustrates transmission in two directions for a four-element antenna array in accordance with the invention.

If the directions of the two mobile stations coincide, then C.C# becomes singular. It may not then be efficient to attempt to transmit different signal levels to mobile stations lying in approximately the same direction, and it may take less total power to increase the lower of the two signal levels (a, b). A numerical example is provided for the case of the four-element array 30 in FIG. 3. In the illustrated array 30, to transmit in the two directions respectively, the four elements 32, 33, 34 and 35 are fed with signals $$C1 = 0.5(e^{-2j\phi_1};\ e^{-j\phi_1};\ e^{j\phi_1};\ e^{2j\phi_1}) \text{ and}$$

$$C2 = 0.5(e^{-2j\phi_2};\ e^{-j\phi_2};\ e^{j\phi_2};\ e^{2j\phi_2})$$

where $\phi_1 = 2\pi\ d\ \sin(\theta_1)/\lambda$ and $\phi_2 = 2\pi\ d\ \sin(\theta_2)/\lambda$.

Thus the matrix C.C# can be calculated to be $$\begin{bmatrix} 1 & 1-\Delta \\ 1-\Delta & 1 \end{bmatrix}$$

where $\Delta = 1 - 0.5[\cos(2\delta\phi) + \cos(\delta\phi)]$ and $\delta\phi = \phi_1 - \phi_2$, and its inverse to be $$\frac{1}{\Delta(2-\Delta)} \begin{bmatrix} 1 & -(1-\Delta) \\ -(1-\Delta) & 1 \end{bmatrix}$$

Because the determinant appears on the denominator of the inverse, the components of the inverse tend to infinity as the two directions approach each other. However, if this matrix multiplies the column vector S=(a, b) with equal signal levels a=b, then the result converges as the directions approach coincidence, as is logical; and there is no problem transmitting equal signals in two closely neighboring directions. When 'a' and 'b' are not equal, however, the required array drive signals do not converge as the directions tend to coincidence, because it is not possible to require substantially different signal levels to be radiated in closely adjacent directions. For the symmetrical, four-element array 30 the solutions for the array drive signals are $$(a+b)\cos(\phi_i)/(2-\Delta) + j(a-b)\sin(\phi_i)/\Delta$$

where $\phi_i$ is the phase of element i for one of the beam directions.

Adding the squared magnitudes of the above for all four elements 32–35 gives the total power. The total power to transmit a signal amplitude 1 in one direction and 0.5 in the mirror-image direction is given in Table 1 below in dBs relative to unit power for different beam squint angles, for a four-element array of omnidirectional radiators with 0.5 wavelength spacing.

TABLE 1

| +/− Squint (degrees) | Total Power (dB) |
| --- | --- |
| 45.0000 | 4.2 |
| 40.0000 | 3.1 |
| 35.0000 | 1.5 |
| 30.0000 | 1.0 |
| 25.0000 | 1.6 |
| 20.0000 | 3.5 |
| 15.0000 | 3.9 |
| 12.0000 | 2.3 |
| 10.00000 | 1.2 |
| 9.00000 | 0.7 |
| 8.00000 | 0.3 |
| 7.00000 | 7.2 |
| 6.00000 | 3.2 |
| 5.00000 | 0.2 |
| 4.50000 | 0.4 |
| 4.00000 | 0.7 |
| 3.50000 | 1.2 |
| 3.00000 | 1.9 |
| 2.50000 | 2.9 |
| 2.00000 | 4.3 |
| 1.50000 | 6.3 |
| 1.00000 | 9.5 |
| 0.800000 | 11.3 |
| 0.700000 | 12.4 |
| 0.600000 | 13.7 |
| 0.500000 | 15.3 |

Table 1 illustrates the rapidly decreasing efficiency in trying to create different signal levels (a,b)=(1, 0.5) as the angular beam spacing approaches zero. There are other regions of smaller inefficiency around beam angles of +/−15 degrees and +/−7 degrees which are caused by the side lobes of one beam being of the inverse sign to the main lobe radiation of the other beam, causing destructive interference. In that case, it is preferred to invert the sign of the second beam, selecting amplitudes of (a, b)=(1, 0.5) with the result in Table 2 below:

TABLE 2

| +/− Squint (degrees) | Total Power (dB) |
|---|---|
| 45.0000 | 0.0 |
| 40.0000 | 0.0 |
| 35.0000 | 0.5 |
| 30.0000 | 1.0 |
| 25.0000 | 0.5 |
| 20.0000 | 0.0 |
| 15.0000 | 0.0 |
| 12.0000 | 0.2 |
| 10.0000 | 0.8 |
| 9.00000 | 1.3 |
| 8.00000 | 1.9 |
| 7.00000 | 2.8 |
| 6.00000 | 3.9 |
| 5.00000 | 5.2 |
| 4.50000 | 6.1 |
| 4.00000 | 7.0 |
| 3.50000 | 8.1 |
| 3.00000 | 9.4 |
| 2.50000 | 10.9 |
| 2.00000 | 12.8 |
| 1.50000 | 15.3 |
| 1.00000 | 18.8 |
| 0.800000 | 20.7 |
| 0.700000 | 21.8 |
| 0.600000 | 23.2 |
| 0.500000 | 24.8 |

This shows that there are beam angles that would favor choosing the opposite phase for the second beam and other beam angles that would favor choosing the same phase. More generally, when it is inefficient to attempt to create a signal in a second direction much lower than that in the first direction, a higher signal level should be created in the second direction, and its optimum level, that which results in the minimum total array power, may be found by differentiating with respect to 'b' and equating to zero, obtaining $$b(opt) = a \left[ \frac{\sum_{i=1}^{4} \frac{\sin^2(\phi_i)}{\Delta^2} - \frac{\cos^2(\phi_i)}{(2-\Delta)^2}}{\sum_{i=1}^{4} \frac{\sin^2(\phi_i)}{\Delta^2} + \frac{\cos^2(\phi_i)}{(2-\Delta)^2}} \right]$$

Thus the above optimum value of the second beam level should be used instead during the overlap period when transmitting the same syncword in the second beam.

At the termination of the first beam transmission, down-ramping can take place by ramping down both 'a' and 'b' from the higher level of b(opt) until 'b' reaches the target signal level for the second beam. However, to continue to ramp 'a' lower while maintaining 'b' may be inefficient unless the first beam direction is swung towards convergence with the second beam direction. The optimum solution can involve different ramping functions for each element, which are complicated functions of the actual antenna element characteristics. However, the complication may be unwarranted by the small increase in performance. As a result, the first implementation described above is preferred in which the first beam ramps down from its signal amplitude 'a' after completing transmission of the second syncword, while the second beam ramps up from zero smoothly to its amplitude "jb" before transmission of the same syncword, where "jb" signifies a signal amplitude of "b" combined with a phase shift of 90° relative to the first beam.

Figure 4:
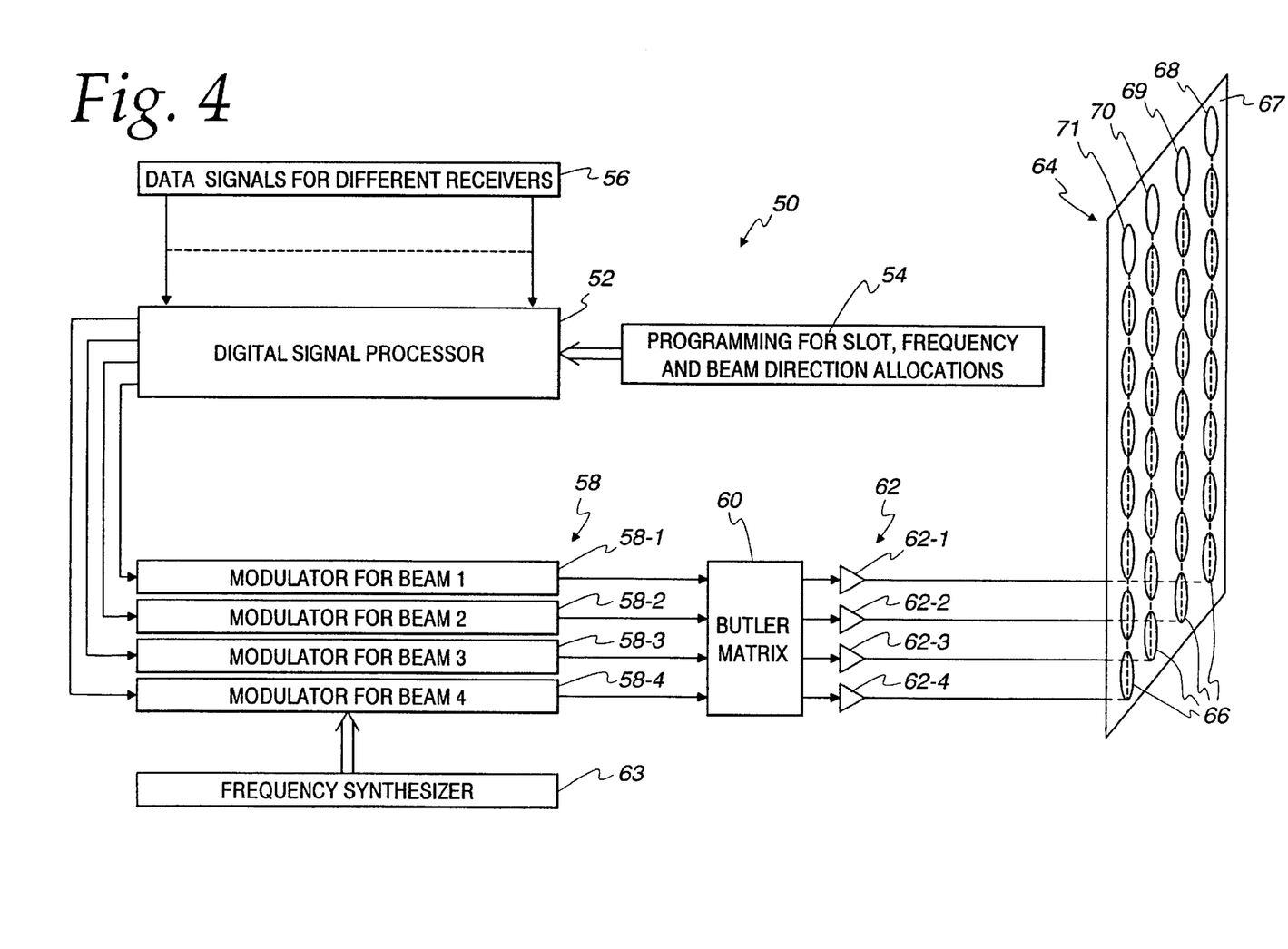
FIG. 4 is a block diagram of a base station in accordance with the invention.

Referring to FIG. 4, a block diagram illustrates a base station 50 for implementing the system and method according to the invention. The base station 50 includes a digital signal processor 52 connected to a memory 54. The memory 54 stores programs implemented by the processor 52 for slot, frequency and beam direction allocations. The processor receives data signals from a block 56 to be transmitted to different receivers in the form of mobile stations. The processor 52 is connected via a modulator bank 58 to a beam-forming network 60. The beam-forming network 60 is connected via a set of linear column amplifiers 62 to an antenna array 64. The antenna array 64 comprises an array of antenna elements 66, such as patch elements, which are printed on a sheet 68 of stripline material. The elements 66 in each of four columns 68, 69, 70 and 71 are interconnected in phase by a phasing line (not shown) to form a co-linear array having vertical directivity, in a conventional manner.

The modulator bank 58 consists of a first modulator 58-1 for beam 1, a second modulator 58-2 for beam 2, a third modulator 58-3 for beam 3 and a fourth modulator 58-4 for beam 3. The linear column amplifiers 62 comprise a first amplifier 62-1, a second amplifier 62-2, a third amplifier 62-3 and a fourth amplifier 62-4.

The four columns 68–71 are driven by the respective power amplifiers 62-1 to 62-4. The power amplifiers, referred to generally as 62, can be multi-carrier power amplifiers that each faithfully amplify a sum of many signals of different frequencies and power levels, so that one set of column amplifiers 62 suffices for many simultaneous beams and frequencies.

The fixed beam-forming network 60, known as a Butler matrix, is used at the input of the set of power amplifiers 62 to accept signals for radiation in a particular direction and to split the input signal in phase between its four outputs such that the radiation from the antenna array 64 will be in the desired direction. Other inputs to the Butler matrix 60 are used for transmission in other directions. The Butler matrix 60 can have more than four inputs, for example eight inputs, and it would then have a corresponding number of outputs, of which only four are connected to the power amplifiers 62. This allows more than four different directions to be defined, the extra beams then overlapping the original four beams substantially. An adaptive channel allocation device (not shown) allocates the frequency, time slot and direction to be used for each call to minimize interference with other ongoing calls transmitted from the same or other similar base station sites nearby.

Signals for transmission in the same direction using different carrier frequencies are generated using the digital signal processor 52, from the data signals 56, added and then jointly modulated using the modulator bank 58 to form the signals for application to the Butler matrix 60. As described in the references incorporated herein, the digital signal processor 52 can implement the function of the Butler matrix 60 and perform it numerically thus eliminating the need for the block 60. When this is done, transmission is no longer restricted to a finite number of pre-determined beam directions, but each signal in each time slot and on each frequency may be independently controlled in beam directions so as to maximize the signal quality received by the intended receivers. A simplified method of digital transmit beam-forming is described in Dent U.S. Pat. No. 5,909,460, the specification of which is incorporated by reference herein.

In general, the processor 52 includes the functions of error coding, modulation, beam-forming, digital frequency-shifting to an allocated channel and digital frequency division multiplexing of signals on different frequency channels to form array drive signals. The array drive signals are then D/A converted and modulated to the desired radio frequency band. The center of the band is defined by a radio frequency signal from a frequency synthesizer 64 associated with the modulator bank 58. The processor 52 can also be programed to apply the up-ramping and down-ramping of the signals for different time slots and different beams to implement the method of the invention. One skilled in the art, with the aid of the disclosure herein and the incorporated art, realizes that all of the above functions can be performed in the numerical domain using complex multiplications and additions.

While the present invention is described relative to a programmed digital signal processor, the system could be implemented using other types of processors or electronic circuitry, as will be apparent to those skilled in the art. Thus, other implementations of the invention are possible, but are considered to lie within the scope and spirit of the invention as defined by the claims.

We claim:

1. A time division multiple access (TDMA) base station for preserving across-slot signal continuity of signals transmitted in different directions on a given frequency, comprising:

a multi-directional antenna for radiating signals;

a processor operatively coupled to the antenna for generating a first data signal for a first time slot of a TDMA frame including a first predetermined symbol pattern and a second predetermined symbol pattern, for generating a second data signal for a second time slot of the TDMA frame including the second predetermined symbol pattern, and for communicating the first data signal and the second data signal to the antenna such that the first data signal is radiated in a first direction and the second data signal is radiated in a second direction; and wherein the first data signal is modulated at a first phase for transmission in the first time slot at a first power level in the first direction on the given frequency, and the second data signal is modulated at a second phase for transmission in the second time slot at a second power level in the second direction on the given frequency.

2. The base station of claim 1 wherein the first power level is substantially equal to the second power level.

3. The system of claim 1 wherein the first phase is at a 90° phase difference with respect to the second phase.

4. The base station of claim 1 further including a modulator for modulating the first data signal and the second data signal on the given frequency.

5. The base station of claim 1 wherein the processor performs the modulating of the first data signal and the second data signal on the given frequency.

6. The base station of claim 1 wherein the power level of the first data signal is ramped-down from the first power level to zero after the second predetermined symbol pattern is transmitted in the first direction, and the power level of the second data signal is ramped-up from zero to the second power level before transmission of the second predetermined symbol pattern in the second direction.

7. The base station of claim 1 wherein the first direction and the second direction are two of four predetermined directions.

8. A time division multiple access (TDMA) cellular base station for transmitting signals in different time slots of a TDMA frame in different directions while preserving across-slot signal continuity as seen by intended receivers, comprising:

an antenna for forming a plurality of directional beams;

a first signal generator for modulating a first data signal including a first predetermined symbol pattern, first data symbols and a second predetermined symbol pattern on a given radio frequency channel to be radiated during a first time slot at a first power level in a first direction using the antenna, wherein the first signal generator smoothly ramps a first data signal level down from the first power level to zero after transmission of the second predetermined symbol pattern; and a second signal generator for modulating a second data signal including at least the second predetermined symbol pattern and second data symbols on the given radio frequency channel to be radiated during a second time slot at a second power level in a second direction using the antenna, wherein the first and second time slots overlap during transmissions of the second known symbol pattern and the second signal generator ramps up to a second data signal level from zero to the second power level prior to transmitting the second predetermined symbol pattern.

9. The cellular base station of claim 8 in which the first signal generator modulates the same data symbols as the second signal generator while performing the down-ramping.

10. The cellular base station of claim 8 in which the second signal generator modulates the same data symbols as the first signal generator while performing the up-ramping.

11. The cellular base station of claim 8 in which the first and second signal generators are adapted to cause the first data signal to be at 90° phase difference with respect to the second data signal when the first and second data signals are radiated from the antenna in the first and second directions during the up-ramping, second predetermined pattern transmission and down-ramping.

12. A method of preserving across-slot signal continuity of signals transmitted in different directions on a given frequency from a time division multiple access (TDMA) base station, comprising the steps of:

generating a first data signal for a first time slot of a TDMA frame including a first predetermined symbol pattern and a second predetermined symbol pattern;

generating a second data signal for a second time slot including the second predetermined symbol pattern;

modulating the first data signal on the given frequency at a first phase;

modulating the second data signal on the given frequency at a second phase;

transmitting the first data signal from the base station in the first time slot at a first power level in a first direction, on the given frequency at the first phase; and transmitting the second data signal from the base station in the second time slot at a second power level in a second direction, on the given frequency at the second phase.

13. The method of claim 12 wherein the first power level is substantially equal to the second power level.

14. The method of claim 12 wherein the step of modulating the second data signal at the second phase includes modulating the second data signal at a 90° phase difference with respect to the first phase for the first data signal.

15. The method of claim 12 wherein the step of transmitting the first data signal at the first power level includes ramping-down from the first power level to zero after transmitting the second predetermined symbol pattern in the first direction.

16. The method of claim 12 wherein the step of transmitting the second data signal at the second power level includes ramping-up from zero to the second power level before transmitting the second predetermined symbol pattern in the second direction.

17. The method of claim 12 wherein the second predetermined symbol pattern of the first data signal is transmitted at the first power level in the first direction simultaneous to the transmission of the second predetermined symbol pattern of the second data signal at the second power level in the second direction.

18. In a TDMA cellular base station, a method of transmitting signals in different time slots of a Time Division Multiple Access (TDMA) frame in different directions using a multi-beam directive antenna array while maintaining across-slot signal continuity as seen by intended receivers of the time slots, including the steps of:

transmitting a first signal in a first direction at a first power level during a first time slot, including transmitting a postamble comprised of predetermined symbols at an end of the first time slot; and transmitting a second signal in a second direction at a second power level during a second time slot, including transmitting a preamble at a beginning of the second time slot comprised of the predetermined symbols, and overlapping the transmission of the postamble.

19. The method of claim 18 including driving elements of the antenna such that the first signal and the postamble are received at the first power level by an intended receiver lying in the first direction and the preamble and the second signal are received at the second power level by a different intended receiver lying in the second direction.

20. The method of claim 19 including selecting the first and second power levels such that each of the intended receivers receives at least a minimum of acceptable signal level while minimizing a total power radiated by the antenna array.

21. The method of claim 19 including selecting antenna element drive signals to cause a direction of transmission to smoothly change from the first direction to the second direction during the overlapping transmission of the preamble and postamble.

22. The method of claim 18 including continuing transmission of the first signal in the first direction for a period after completing transmission of the postamble while the power level of transmission of the first signal is smoothly ramped-down to zero.

23. The method of claim 18 including commencing transmission of the second signal in the second direction for a second period before starting transmission of the preamble while the power level of transmission of the second signal is smoothly ramped-up from zero.

* * * * *